United States Patent [19]

Gorin

[11] Patent Number: 5,057,256

[45] Date of Patent: Oct. 15, 1991

[54] PROCESS FOR MANUFACTURING A TOOL, PARTICULARLY A TOOL FOR STAMPING AND PRINTING METAL SHEET PARTS

[75] Inventor: Gilbert A. F. Gorin, Le Miroir, France

[73] Assignee: Societe Anonyme des Usines Chausson, Courbevoie, France

[21] Appl. No.: 386,090

[22] Filed: Jul. 28, 1989

[30] Foreign Application Priority Data

Aug. 2, 1988 [FR] France .................... 88 10422
Dec. 14, 1988 [FR] France .................... 88 16466

[51] Int. Cl.$^5$ .................... B23P 17/00; B28B 1/16; B29C 33/40; B32B 31/00
[52] U.S. Cl. .................... 264/113; 29/527.4; 264/112; 264/225; 264/256; 264/261; 264/275; 264/308
[58] Field of Search .......... 264/219, 220, 225–227, 264/256, 112, 308, 113, 69, 71, 72, 260, 261, 275, 277, 279; 29/527.4

[56] References Cited

U.S. PATENT DOCUMENTS

| | | | |
|---|---|---|---|
| 2,836,530 | 5/1958 | Rees | 264/226 X |
| 3,101,065 | 8/1963 | Kalis | 264/226 X |
| 3,548,050 | 12/1970 | Mozer | 264/226 X |
| 4,073,049 | 2/1978 | Lint | 264/219 X |
| 4,536,364 | 8/1985 | Lindskog | 264/227 |
| 4,601,867 | 7/1986 | Martell et al. | 264/227 |
| 4,750,827 | 6/1988 | Assus et al. | 264/226 X |
| 4,834,929 | 5/1989 | Dehoff et al. | 264/226 |

FOREIGN PATENT DOCUMENTS

| | | | |
|---|---|---|---|
| 96745 | 6/1982 | Japan | 264/225 |
| 96746 | 6/1982 | Japan | 264/225 |

*Primary Examiner*—Jan H. Silbaugh
*Assistant Examiner*—Karen Aftergut
*Attorney, Agent, or Firm*—Browdy and Neimark

[57] ABSTRACT

A method of manufacturing and using a resinous concrete in the production of forming tools for stamping, trimming and other treatments of sheet metal parts. The process includes first mixing at least one resin and hardening agent and then adding a siliceous pulverulent grain filler so that the gravimetric ratio between the resin and hardening agent and the filler when mixed for a time depending on the working temperature at a work site will result in a mixture of filler grains and resin essentially free of macromolecules and having remaining spaces between the grains filled with the essentially macromolecular free resin thereby eliminating the formation of bending bridges. The final mixture is then poured into a casing containing working parts and moulding elements to create forming tools useable after the mixture polymerizes.

28 Claims, 3 Drawing Sheets

PROCESS FOR MANUFACTURING A TOOL, PARTICULARLY A TOOL FOR STAMPING AND PRINTING METAL SHEET PARTS

BACKGROUND OF THE INVENTION

The present invention concerns the manufacturing of resinous concrete forming tools, particularly tools for use with presses for stamping and trimming metal parts. The tools also can be used for other operations performed by presses.

The invention concerns essentially the preparation and use of resinous concrete for producing composite forming tools having metal working parts made of metal or other wear resisting materials with such working parts being supported and anchored in the resinous concrete.

The tools produced are to be used to produce prototypes in cooperation with hydraulic presses which avoid shocks that might break the resinous concrete.

The invention provides for a new manufacturing process which produces resinous composite concrete tools usable on mechanical presses with high working speed, for example 18 to 20 cycles per minute, instead of 2 to 3 cycles conventional with hydraulic presses. Moreover the tools produced by this process make production runs of roughly 100,000 parts possible and are usable for productions of small and middle size production runs. Further tools produced by the process can undergo grinding by mechanical machining, as well as recharging repairs.

Another advantage of the invention is that some of the tool working parts may be made of resin having qualities that enables the forming of sliding metal blank parts without excessive tearing or thinning.

The invention also makes possible production of complicated tools that require edge dropping of stamped parts and their burring.

SUMMARY OF THE INVENTION

The invention provides a method of manufacturing and using a resinous concrete in the production of forming tools for stamping, trimming and other treatments of sheet metal parts. The resinous concrete is prepared for use in forming such tools by first mixing at least one resin and its hardening agent and then adding a siliceous pulverulent grain filler so that the gravimetric ratio between resin and hardening agent and the charge, being determined in order that during a blending mixing operation, having a duration determined according to the working temperature, the resin is still free of macromolecules at least partly, but that it moistens the grains of the charge and fills up the interstices separating said grains without creating bending members between them. The mixture is then poured into a mould with working parts or moulding elements which together with the resulting polymerized concrete represents the forming tools of this invention.

Various other features of the invention will be made clear from the detailed description which follows.

BRIEF DESCRIPTION OF THE DRAWINGS

Some forms of execution of the invention are represented as non-limited examples, in the enclosed drawings.

DESCRIPTION OF PREFERRED EMBODIMENTS

Figure 1:
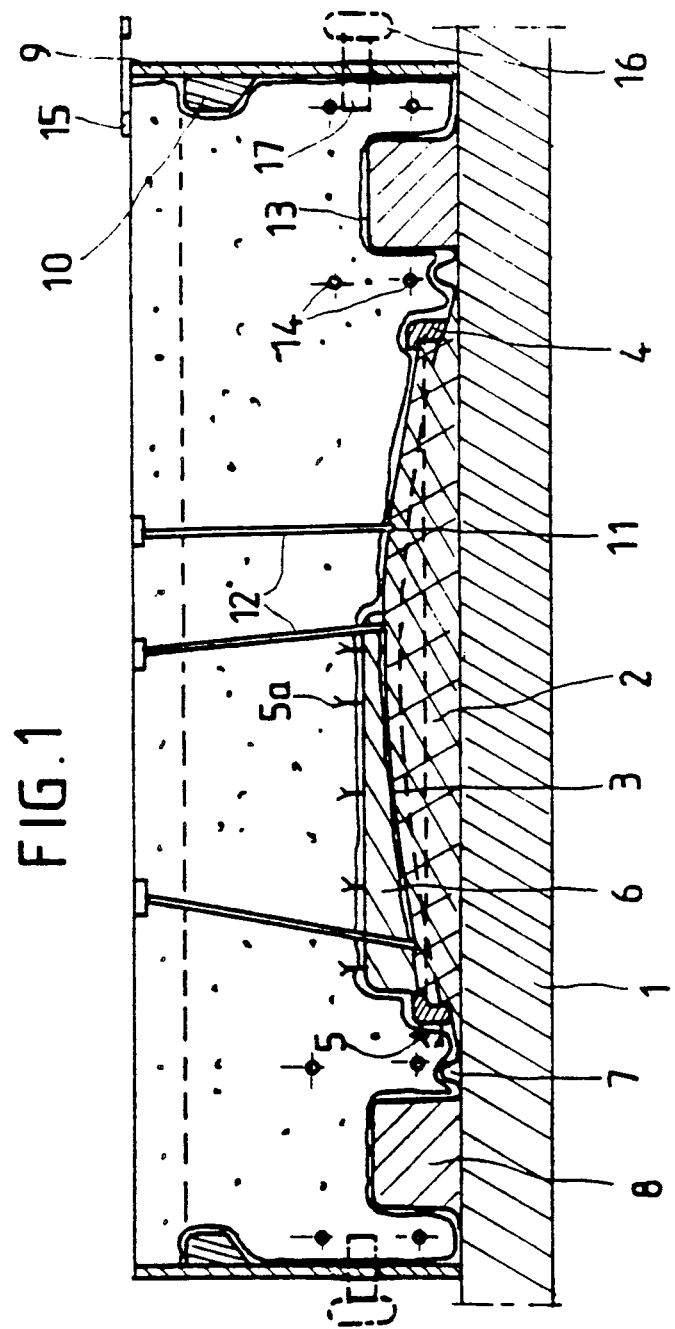
FIG. 1, is a schematic elevation cross section of a stamping die tool made according to the invention.
Figure 2:
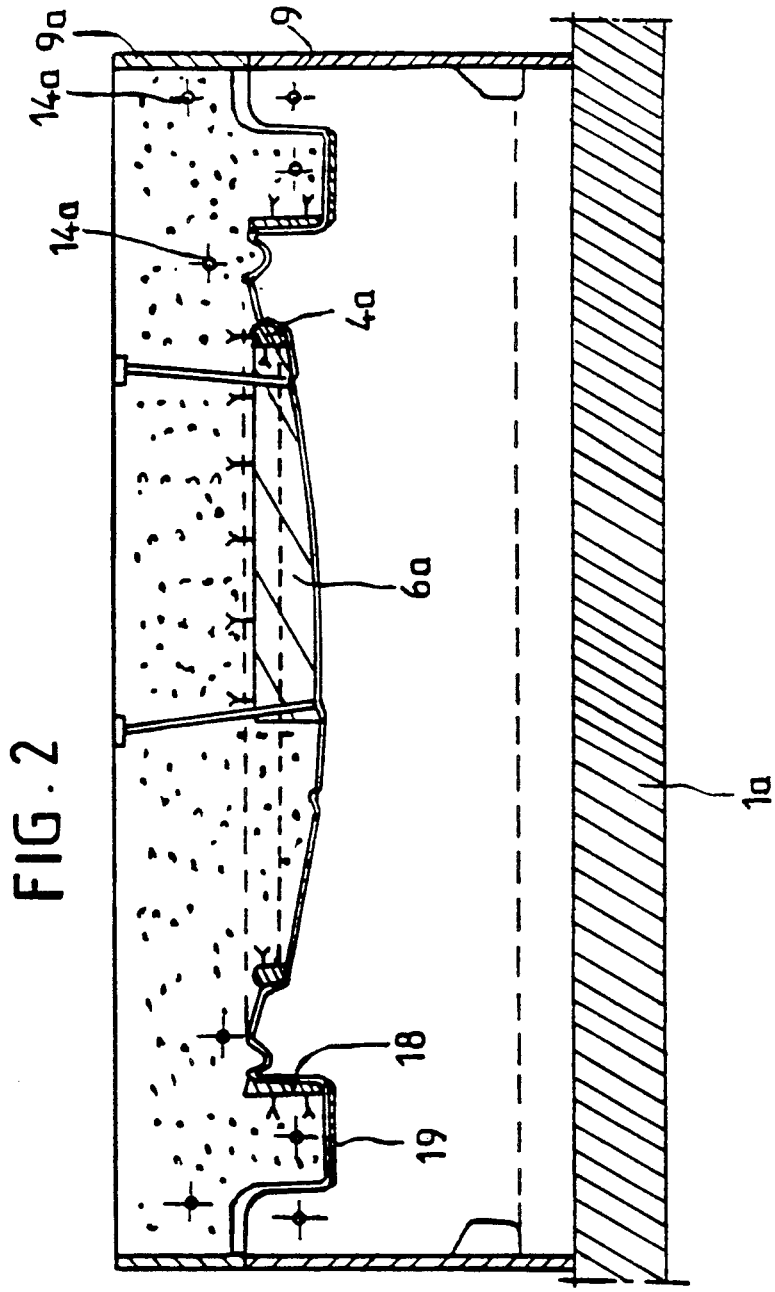
FIG. 2, is a schematic elevation cross section similar to FIG. 1 of a stamping punch complementary to the die of FIG. 1.

FIG. 1 illustrates a stamping die and FIG. 2 a stamping punch which cooperates with the die of FIG. 1.

The manufacturing operations are described successively hereafter for both the die and punch in order to point out the similarity of their fabrication.

In FIG. 1, 1 indicates a table on which is placed a reference pattern 2, made of wood such as alder, covered with a coating element, particularly a metal sheet 3. The reference model 2 is fixed on the table 1, for example by means of adhesive elements, not represented but permitting removal after completion tool. The covering plate 3 is chosen with a thickness corresponding to the one which will be made by the tool. Then metal inserts 4 fitted with wall anchors 5 are added on pattern 2.

When making the inserts 4, all its edges are directed towards the inside of the tool and will be sealed into the resinous concrete described hereafter. The edges are rounded, so that the loads transmitted to the metal inserts when the tool is operative will be distributed on a surface as evenly as possible and that there be no cutting edge between the inserts and the resin concrete.

Other working parts such as 6 are placed on pattern 2 in the same manner. For example, insert 6 which is made of cast iron, is provided with anchors 5a which are provided to protrude into the resinous concrete.

A retaining roll 7 for example, is placed around the reference pattern 2 to form a retaining ring groove on the sheet blank to be formed. The retaining roll 7 is directly placed on the table 1 in the same way as a peripheral key 8 to be used to form a recess in the die. Then, dam 9 which can be made of wood, is placed on table 1 to form the external part of the tool. If needed, the dam 9 is fitted with various accessories, for example a belt or blocks 10, to form a groove or flanging recesses for positioning the tool on a press. The dam 9 is rigid in order to preclude deformation when pouring the resin concrete into the dam.

In addition, holes, like the one shown at 11, are provided at least in metal sheet 3 which covers pattern 2. Tubes 12 are formed to engage these holes and extend to the top of the dam. The holes 11 and the tubes 12 will allow evacuation of the air between the cooperating working tools die and punch during the stamping cycles.

When the various parts hereabove described, are positioned and the process of producing the die of this invention is initiated, a release coating such as wax is applied to all the visible parts and accessories, and the internal walls of the dam except the metal inserts 4 and working parts 6 for reasons discussed below.

The next step in the process operation consists in applying, on the internal walls of the dam and on the parts and accessories herein contained, a surface layer 13 or "gel-coat" made from a ethoxylin resin, mixed with a compatible hardening agent.

Very satisfactory results have been obtained when realizing the surface layer 13 by applying two successive layers of a mixture of SW 419 type ARALDIT and HV 419 hardening agent, both of them manufactured by CIBA-GEIGY. The proportion of hardening agent was 13–0.5 parts in weight for 100 parts in weight of ARALDIT. The application of the second surface layer is made as soon as the first layer reaches a sticky polymerization stage.

The next step in the process of producing the die invention consists in lining the surface layer 13 which is between 15 and 2.5 mm thick with a linking layer which is applied as soon as the surface layer reaches a sticky state.

Very satisfactory results have been reached when forming the linking layer so that it contains 100 parts in weight of SW type ARALDIT, 15–0.5 parts in weight of HM type hardening agent, and 25–10 parts in weight of slate flour with a granulometry between 0.4 and 3 mm, a granulometry near 0.5 mm being preferred.

The next step of the process involves filling the remaining volume with resinous concrete material thereafter referred as filling concrete.

The filling concrete which was particularly satisfactory comprised the following:
CY 219 ARALDIT = 100 parts in weight
HM hardening agent 50 + 1 part in weight
sand, reference G@650 + 50 parts in weight
sand, reference F 35 650 + 50 parts in weight ARALDIT CY 219 as well as hardening agent HM are products distributed by CIBA-GEIGY, while sand, reference G2, is a quartz silica sand containing grits distributed as follows:
5% grits 1.25–1.60 mm
25% -id- —1.25 mm
45% -id- 0.8–1 mm
15% -id- 0.63–0.8 mm
10% -id- 0.5–0.63 mm Particular satisfaction was obtained with a sand distributed SILICE ET KAOLIN and its physical and chemical properties are the following:

| Physical Properties | |
| --- | --- |
| True density | 2.65–2.7 |
| Free apparent density | 1.3–1.5 |
| Melting point | 1750° C. approximately |
| Mohs Hardness | 7 approximately |
| Regain of Humidity at 98% of relative humidity | less than 0.03 |
| pH | 8 |
| Color | milky to pink beige |
| Chemical Properties/Chemical Analysis in % | |
| $SiO^2$ | 98.5–99 |
| $Al^2O^3$ | 0.3–0.5 |
| Loss on ignition at 800 | 0.1–0.2 |
| $Fe^2O^3$ | 0.2 |
| Cao + MgO | 0.15 |
| $K^2O\ Na^2O$ | 0.20 |

The constituents of the filling concrete are poured into the dam 9 after mixing for a period of time that enables the resin to moisten the grits and to completely fill in the interstices of the sand grits. The mixing operation is interrupted before the beginning of a polymerization which might bring about the physical rupture of the macromolecules created.

It appeared that the mixing of the resin-sand composite material should not exceed 15 minutes, at a working temperature of 16° C. The mixing time can be reduced to approximately 10 minutes when the temperature is held between 19° and 20° C.

The prepared filling concrete is poured, either continuously or in successive fractions. As the filing of dam 9 goes on, concrete reinforcing bars 14, are positioned in the sand dam to reinforce the tool when compressed in operation.

Once the casing 9 is filled up, the tool is maintained on the table 1 until the resinous concrete polymerizes. At the temperature of 16° C., it is found that 24 hours appeared to be sufficient before dam 9 could be taken off, and re-used. Notwithstanding removal of the dam the polymerization of the resin concrete must continue, preferably, without moving the tool for another 24 hour period. If required, the polymerization may be accelerated by subjecting the tool to heating at temperature corresponding to the one usually used for the treatment of ARALDIT resins.

When the tool is maintained at a temperature of 16° C., the hardening for a complete polymerization, is approximately 7 days.

FIG. 2 illustrates schematically the punch made from the die as described hereabove and shown in FIG. 1. In order to make the punch illustrated in FIG. 2, the polymerized die is machined on the top to offer a plain top. Alternatively, marking blocks 15 (FIG. 1) can be formed before the die is lifted from table 1 to form a known reference plane. It is also possible to form a plane surface from a resin. Thereafter the die is turned upside down, and placed on table 1a. The die is turned over by using handling lugs 16 (FIG. 1) positioned in the filling concrete in recesses 17 provided by means of sleeves previously placed into the dam 9 or by any other known means of techniques.

Making the punch is accomplished in the same manner as making the die. Accordingly inserts 4a and working parts 6a and bars 18 are assembled as shown in FIG. 2, to form a punch that will stamp out edges and burr components. As in the die, other accessories may be utilized particularly covering 19 to free determined spaces between the punch and the die.

In the same manner as described is producing the die shown in FIG. 1, the punch surface is formed by a "gel-coat" made of ARALDIT and its hardening agent applied in several layers. Then in the same manner a linking layer made of resin with mineral is added making an intermediate layer before placing filling concrete into a dam 9a on the dam 9 upside down as previously explained.

Reinforcing elements 14a are placed while pouring the filling concrete.

To illustrate the invention, an example of preparation of the various resins and resin concrete used, is given hereafter.

EXAMPLE

A first surface layer "gel-coat", made of SW 419 ARALDIT representing 100 parts in weight, together with HV 419 hardening agent representing 13 parts in weight was spread at a temperature of 16° C. over the parting agent covering dam 9 and the various components and accessories contained within dam 9, as described in FIG. 1 to realize a first layer with a thickness approximately 0.4–0.8. As soon as this first layer became sticky, a second layer was spread over. The second layer was spread over the working parts of the die not fitted with metal inserts or fitted with added working parts. As soon as the second layer became sticky, a thickness of approximately 0.5-1 mm of a linking layer was laid by projection on all the internal surfaces of dam 9. The linking layer was made of SW 419 ARALDITE and HM hardening agent respectively in 100 parts in weight and 15 parts in weight.

As soon as the hereabove linking layer had a pasty consistency, dam 9 was filled with resin concrete comprising a binder made of 8 kg of CY 219 ARALDITE resin and 4 kg of HM hardening agent from CIBA-GEIGY which was poured into a mixer with 5 to 10 kg of sand, reference G2, from SILICE FT KAOLIN CY, and 5 to 10 kg of F35 sand from the same company, also made of quartz silicas, including 5% grits between 0.8 and 1 mm, 35% grits between 0.630 and 0.80 mm, 35% grits between 0.50 and 0.630 mm and 15% grits between 0.40 and 0.50, which are poured successively.

50 kg of both sands were used. The resin-sand composite material was mixed during 15 minutes, then poured successive layers with regular thickness, into the dam 9, while compressing carefully. A wooden stick is placed through the last filling layer of concrete to form air venting tubes 12 described in reference to FIG. 1. An ARALDIT resin layer poured to form the tool surface which is, then, left for 48 hours at the constant temperature of 16° C. to permit a polymerization and handling.

Different mixing times were attempted during the experiments that let to the inventive process of making the resinous concrete discussed. During these experiments it was noted that increasing the mixing time for the composition of the resin and hardening agent hereabove stated, resulted in a diminution of the compression characteristics of the resin concrete. The decrease in compression strength as time of mixing increased is noted from the following data:

| Mixing 15 Minutes | | | | |
| --- | --- | --- | --- | --- |
| Maximum Load | kN | 68.3 | 75.3 | 75.7 |
| Bearing Load | $N/mm^2$ | 37.3 | 44.9 | 44.2 |
| Average Bearing Load | $N/mm^2$ | 44.5 = 4.5 $kg/mm^2$ = 454 $kg/cm^2$ | | |

| Mixing 30 Minutes | | | | |
| --- | --- | --- | --- | --- |
| Maximum Load | kN | 66.3 | 69 | 67.6 |
| Bearing Load | $N/mm^2$ | 40.6 | 41.7 | 40.0 |
| Average Bearing Load | $N/mm^2$ | 41.1 = 4.1 $kg/mm^2$ = 419 $kg/cm^2$ | | |

| Mixing 45 Minutes | | | | | |
| --- | --- | --- | --- | --- | --- |
| Maximum Load | kN | 66.4 | 74.2 | 76.8 | 65.8 |
| Bearing Load | $N/mm^2$ | 40.8 | 45.2 | 41 | 39.8 |
| Average Bearing Load | $N/mm^2$ | 40.5 = 4.1 $kg/mm^2$ = 413 $kg/cm^2$ | | | |

It was also determined to be advantageous to prepare only small quantities of resin concrete, for instance 10-15 kg, while working it at a temperature between 16° and 19° C. Beyond the above weight and temperature, the polymerization tends to be accelerated due to the larger mass effecting exothermical reaction which required a reduced mixing time detrimental to the concrete homogeneity.

Figure 3:
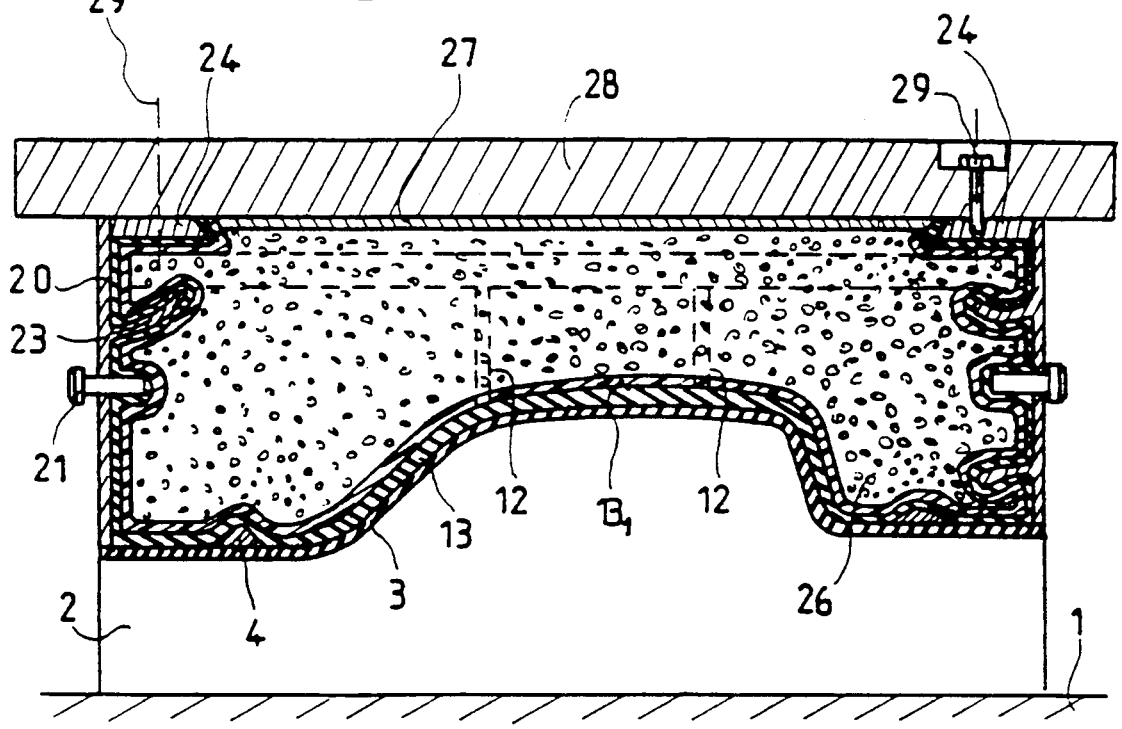
FIG. 3, is a schematic elevation cross section of an alternate embodiment of the stamping tool.

As in the previously described embodiments, FIG. 3 shows schematically, a table 1 on which is placed a mode, reference 2, formed for example, in wood or constituted by another tool. Model 2 is covered with a coating element 3, provisional, noncompressible, forming a gauge which thickness and shape correspond to those of a metal sheet to be worked by the tool to be made.

The coating element 3 is covered, on the periphery, with a metal shell 20 forming a dead mould and a hooping. The shell 20 is fitted, in its wall, with various accessories mainly slinging shackles 21, for example fixed by welds.

The internal part of the shell 20 is also fitted with wall anchors 23 and fastening wedges 24 which are also preferably welded.

Various equipment such as outgoing air vents 12, are also provided inside the shell 20. Metal inserts 4 resting directly on the coating device 3 are also provided.

The internal wall of shell 20 is degreased, possibly scraped and, preferably, made rough.

In the example illustrated in FIG. 3, the shell 20 is placed directly on the periphery of the coating device 3.

When the above described parts are prepared, a parting product, such as wax is applied on the coating device 3, but not on the metal insert 4. A first surface layer 13 or "gel-coat" which is applied in several passes is applied as the final surface layer in a thickness of approximately 2.5 mm.

The surface layer or "gel-coat" 13 is also laid on the internal wall of shell 2a to cover all the parts and as the accessories.

The thickness of the surface layer applied inside shell 20 is preferably only between 0.6 and 2 mm.

The surface layer 13 is formed as previously explained in regard to FIGS. 1 and 2, for example an ethoxylin resin particularly the one known under ARALDITE mixed with a compatible hardening agent.

Then, the surface layer 13 is coated with a linking layer $13_1$ similar to the one already described and containing for example, 100 parts in weight of ARALDITE, 15+0.5% parts in weight of hardening agent and 10 parts in weight of a slate flour.

The thickness of the linking layer $13_1$ is approximately 3 mm, which is preferably applied in two passes, the first pass being made when the surface layer is still sticky.

Figure 5:
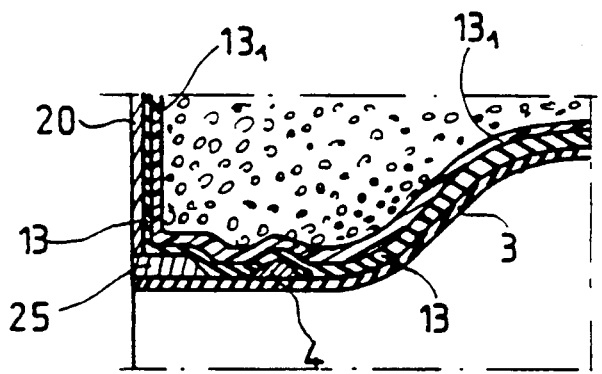
FIG. 5, is a partial elevation cross section illustrating another alternative.
Figure 4:
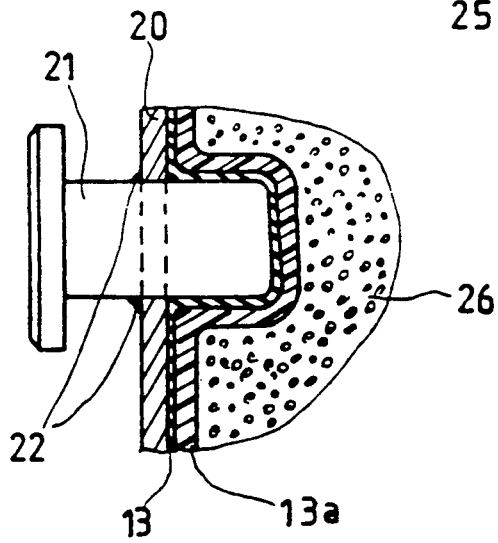
FIG. 4, is a partial enlarged schematic elevation cross section of a detail of realization.

FIG. 5 illustrates a version of FIG. 3 in which the shell 20 is insulated from the coating device 3 by a removable seal 25, made of foam, wax or any other adequate material. The seal 25 may be formed in several layers to facilitate its formation and the position adjustment of shell 20.

The vacant volume inside the shell is filled with a composite concrete 26 having a composition similar to the one described previously, that is to say an ARALDITE resin, a hardening agent and siliceous matters.

Half the composite concrete is silica sand, including 5% in weight of particles with a granulometry between 1.25 and 1.6 mm, 25% in weight of particles with a granulometry between 1 and 1.25 mm, 45% in weight of particles with a granulometry between 0.8 and 1 mm, 15% in weight of particles with a granulometry between 0.63 and 0.8 mm, 10% in weight of particles with a granulometry between 0.5 and 0.63, and a silica sand including 5% in weight of particles with a granulometry between 0.8 and 1 mm, 35% in weight of particles with a qranulometry between 0.630 and 0.8 mm, 35% in weight of particles with a granulometry between 0.5 and 0.630 mm, 15% in weight of particles with a granulometry between 0.4 and 0.5 mm and 10% in weight of particles with a granulometry between 0.315 and 0.4 mm.

Once the composite concrete 26 is poured, its free surface is coated with a flattening layer 27 formed with ARALDITE resin or in any other compatible similar material. The tool top is coplanar to the free surface of the fasten wedge 24 which permits fixing shell 20 to a plate by means of bolts 29 or any other pertinent device. The plate 28 allowing the tool to be mounted on a press as a dead mould.

It is preferable for the surface layer 13 which constitutes the working layer, to be thicker than the one of the internal wall of the shell.

It is advantageous for the composite concrete 26 to be compacted while being poured into the shell so that the shell 20 acts to prestress the tool core constituted by the polymerized composite concrete.

After mounting the tool on the plate 28, the joint 25 is taken off, thus creating a peripheral relief allowing to limit the working part to the dimensions of the drawing.

| ARALDITE SW 419 (filler containing modified epoxy resin) | |
| --- | --- |
| Physical state and Presentation on delivery | black, thixotropic paste |
| Flash point (Pensky-Martens) | °C. >200 |
| Viscosity at 25° C. | mPa s 130,000–180,000 |
| Density at 25° C. | g/cm$^3$ 2.7 |
| Storage capacity at 18–25° C. | 1 year |
| HARDNER HV 419 (Hardner with a base of formulated polyamide) | |
| Physical state and Presentation on delivery | clear, transparent yellow paste |
| Flash point (Pensky-Martens) | °C. 110 |
| Density at 25° C. | g/cm$^3$ 1.0 |
| Storage capacity at 18–25° C. | 1 year |
| Samely, for ARALDITE CY 219 AND HARDNER HM | |
| ARALDITE CY 219 | |
| Presentation on delivery | clear transparent yellow liquid |
| Viscosity at 25° C. | mPa s 10,000–12,000 |
| Density | g/cm$^3$ 1.1–1.2 |
| Flash Point (Pensky-Martens) | °C. >200 |
| Storage capacity at 18–25° C. | 2 years |
| HARDNER HM | |
| Presentation on delivery | clear transparent yellow liquid |
| Viscosity at 25° C. | mPa s 30–70 |
| Density | g/cm$^3$ 1.0 |
| Flash point (Pensky-Martens) | °C. 162 |
| Storage capacity at 18–25° C. | 1 year |

The ARALDIT resins previously indicated may be replaced by similar resins as far s the resins assure a suitable moistening of the matter and a filling of the interstices separating the grits of the matter without the resins forming a bending member between the grits. Attached working pieces or parts may also be realized in materials other than metal, synthetic resins, elastomers loaded or not, synthetic fibers, etc. . . . , may be used to be adapted to a particular work of one part of the tool. Similarly, by siliceous matter indicated previously and in the claims, it is to be understood a matter wettable by the used resins and having the characteristics to be incompressible at the working pressures of the concerned tools.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

I claim:

1. A process for manufacturing forming tools, comprising the steps of:

mixing a resin and hardening agent;

adding a siliceous pulverulent grain filler in a gravimetric ratio among said resin, said hardening agent and said grain filler to form a mixture, said grain filler being constituted by quartz silicas having a granulometry between 1.25 and 0.3 mm;

mixing said resin, said hardening agent and said grain filler at a work site within a range for about 10 to 15 minutes at a temperature between about 20° C. and 16° C.;

observing said mixture to determine the advent of polymerization;

interrupting said mixing within said time range substantially before the beginning of polymerization to thereby avoid the formation of the macromolecules and bending bridges within said mixture, thereafter pouring said mixture essentially free of macromolecules into a dam containing working parts; and polymerizing said resin to create a resinous concrete forming tool;

wherein before said pouring of said mixture, said resin has moistened said grain filler and filled spaces between the grains of said grain filler thereby eliminating the formation of bending bridges within said mixture.

2. The process as set forth in claim 1, wherein said resin is an ethoxylin resin.

3. The process as set forth in claim 1, wherein said mixture is made with a binder containing approximately 8 kg of resin and 4 kg of hardening agent mixed with 100 kg of a substance made of quartz silica sand.

4. The process as set forth in claim 1, wherein said siliceous pulverulent grain filler is of a composition which comprises 50% of a first silica sand and 50% of a second silica sand, said first silica sand comprising 5% in weight of particles with a granulometry between 1.25 and 1.6 mm, 25% in weight of particles with a granulometry between 1 and 1.25 mm, 45% in weight of particles with a granulometry between 0.8 and 1 mm, 15% in weight of particles with a granulometry between 0.63 and 0.8 mm, 10% in weight of particles with a granulometry between 0.5 and 0.63 mm, and said second silica sand containing 5% in weight of particles with a granulometry between 0.8 and 1 mm, 35% in weight of particles with a granulometry between 0.630 and 0.8 mm, 35% in weight of particles with a granulometry between 0.5 and 0.630 mm, 15% in weight of particles with a granulometry between 0.4 and 0.5 mm, and 10% in weight of particles with a granulometry between 0.315 and 0.4 mm.

5. The process as set forth in claim 1, wherein said siliceous pulverulent grain filler has the following physical characteristics:

| | |
|---|---|
| True density | 2.65-2.7 |
| Free apparent density | 1.3-1.5 |
| Melting point | 1,750° C. approx. |
| Mohs hardness | 7 approx. |
| Moisture regain at 98% of relative humidity | less than 0.03 |
| pH | 8 |
| Color | milky to pink beige. |

6. The process as set forth in claim 1, wherein said siliceous pulverulent grain filler has the following chemical analysis in percentage by weight:

| | |
|---|---|
| $SiO_2$ | 98.5-99 |
| $Al_2O_3$ | 0.3-0.5 |
| Loss on ignition at 800° C. | 0.1-0.2 |
| $Fe_2O_3$ | 0.2 |
| CaO + MgO | 0.15 |
| $K_2O + Na_2O$ | 0.20. |

7. The process as set forth in claim 1, comprising the steps of providing a table and positioning a reference pattern on said table; said dam containing working parts, reinforcing flanges and other accessories special for said tool and moulding elements; coating said dam, reference pattern and accessories and moulding element with a parting material; forming a surface layer of gel-coat of said resin and hardening agent; and connecting said surface layer to said mixture when said surface layer reaches a sticky condition indicating a beginning of polymerization.

8. The process as set forth in claim 7, wherein said surface layer is connected to said mixture by means of a linking layer constituted from a binder containing said resin and hardening agent and a charge made of slate flour in an amount of approximately 25+10 parts in weight for 100 parts in weight of resin.

9. The process as set forth in claim 7, wherein said mixture is placed by successive layers to completely encase said working parts and moulding elements of said tool, and wherein reinforcing elements are placed while pouring said mixture.

10. The process as set forth in claim 7, wherein said working parts are made of metal inserts and wall anchors, said working parts and other accessories being machined in order to have no sharp edge in the portions thereof in contact with the surface layer of said mixture.

11. The process as set forth in claim 7, wherein said surface layer of gel-coat is formed in two layers, at least on said working parts.

12. The process as set forth in claim 1, comprising an application of a flattening layer on a free surface of said mixture at the end of the pouring of said mixture, said flattening layer being made of said resin and hardening agent.

13. The process as set forth in claim 1, comprising the step of forming air vents between said working parts of said tool and a top of the tool surface.

14. The process as set forth in claim 1, wherein at least some of said working parts are made of metal, loaded elastomer synthetic resin, synthetic fiber or other material adapted for particular work with said tool.

15. The process according to claim 1, wherein said mixture is prepared in quantities allowing said grains of said filler to be moistened during said mixing and before occurrence of a reaction causing an exothermic release leading to a partial polymerization of said mixture.

16. The process as set forth in claim 1, wherein said dam is formed as a metal shell constituting a dead mould into which said mixture is compacted.

17. The process as set forth in claim 16, wherein said shell has an internal wall covered with a surface layer and a linking layer before pouring said mixture.

18. The process as set forth in claim 1, wherein said working parts of said tool are formed on a reference pattern after said pattern is covered by a coating member with a thickness equal to a thickness of a metal sheet to be formed, and on which a parting product is applied before applying a surface layer and a linking layer to engage said mixture.

19. The process as set forth in claim 17, wherein the surface layer forms part of a working surface for said tool and has a greater thickness than that of said linking layer covering said internal wall of said shell.

20. The process as set forth in claim 16, wherein said shell is placed on a coating member through a seal to form a peripheral clearance.

21. The process as set forth in claim 17, wherein said surface layer, partly serves as the working layer of said tool and is laid down in several passes to a thickness of about 2.5 mm.

22. The process as set forth in claim 18, wherein said linking layer has a thickness of about 3 mm and is formed in several passes.

23. The process as set forth in claim 17, wherein the shell forms a dead mould and is fitted with accessories embedded at least partly in said surface layer, said linking layer and said mixture.

24. The process as set forth in claim 23, wherein said accessories include slinging shackles, wall anchors and fixing wedges.

25. The process as set forth in claim 1, wherein said resin has the following features:

| | |
|---|---|
| Physical state and presentation on delivery | black, thixotropic paste |
| Flash point (Pensky-Martens) | >200° C. |
| Viscosity at 25° C. | mPa s 130,000-180,000 |
| Density at 25° C. | g/cm$^3$ 2.7 |
| Storage capacity at 18-25° C. | 1 year. |

26. The process as set forth in claim 1, wherein said hardener has the following features:

| | |
|---|---|
| Physical state and presentation on delivery | clear transparent yellow paste |
| Flash point (Pensky-Martens) | 110° C. |
| Density at 25° C. | g/cm$^3$ 1.0 |
| Storage capacity at 18-25° C. | 1 year. |

27. The process as set forth in claim 1, wherein said resin has the following features:

| | |
|---|---|
| Presentation on delivery | clear transparent yellow liquid |
| Viscosity at 25° C. | mPa s 10,000-12,000 |
| Density | g/cm$^3$ 1.1-1.2 |
| Flash point (Pensky-Martens) | >200° C. |
| Storage capacity at 18-25° C. | 2 years. |

28. The process as set forth in claim 1, wherein said hardener has the following features:

| | |
|---|---|
| Presentation on delivery | clear transparent yellow liquid |
| Viscosity at 25° C. | mPa s 30-70 |
| Density | g/cm$^3$ 1.0 |
| Flash point (Pensky-Martens) | 162° C. |
| Storage capacity at 18-25° C. | 1 year. |

* * * * *